United States Patent
Wang et al.

(10) Patent No.: US 11,855,887 B2
(45) Date of Patent: *Dec. 26, 2023

(54) DATA FLOW REDIRECTION METHOD AND SYSTEM, NETWORK DEVICE, AND CONTROL DEVICE

(71) Applicant: Huawei Technologies Co., Ltd., Shenzhen (CN)

(72) Inventors: Haibo Wang, Beijing (CN); Shunwan Zhuang, Beijing (CN); Yuan Rao, Beijing (CN); Ruiqing Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,129

(22) Filed: Jun. 17, 2020

(65) Prior Publication Data
US 2020/0389395 A1     Dec. 10, 2020

Related U.S. Application Data

(63) Continuation of application No. 16/195,103, filed on Nov. 19, 2018, now Pat. No. 10,715,430, which is a (Continued)

(30) Foreign Application Priority Data

May 18, 2016  (CN) .......................... 201610332658.1

(51) Int. Cl.
*H04L 45/00*     (2022.01)
*H04L 45/02*     (2022.01)
(Continued)

(52) U.S. Cl.
CPC .............. *H04L 45/54* (2013.01); *H04L 45/02* (2013.01); *H04L 45/22* (2013.01); *H04L 45/38* (2013.01);
(Continued)

(58) Field of Classification Search
None
See application file for complete search history.

(56) References Cited

U.S. PATENT DOCUMENTS 5,764,624 A * 6/1998 Endo ................... H04L 49/3081
370/392
8,909,736 B1 * 12/2014 Bosch ................... H04L 65/612
709/217

(Continued)

FOREIGN PATENT DOCUMENTS

CN     101098308 A     1/2008
CN     101175078 A     5/2008
(Continued)

OTHER PUBLICATIONS

Dong, J., et al., "BGP FlowSpec Extensions for Large Scale Prefix based Steering," draft-dong-idr-flowspec-scalable-prefix-steering-00, Jul. 4, 2016, 9 pages.

(Continued)

*Primary Examiner* — Clemence S Han
(74) *Attorney, Agent, or Firm* — Conley Rose, P.C.

(57) ABSTRACT

A data flow redirection method to overcome a disadvantage that a quantity of adjustable data flows is relatively small due to limited space of a flow specification forwarding table. The method includes receiving, by a network device, a control message sent by a control device, where the control message carries redirection routing information of a data flow and a redirection routing indication, the redirection routing indication instructing to convert the redirection routing infor- (Continued)

mation of the data flow into a forwarding entry in a target forwarding table, and tablespace of the target forwarding table is greater than tablespace of a flow specification forwarding table of the network device, and converting, by the network device, the redirection routing information of the data flow into the forwarding entry in the target forwarding table according to the redirection routing indication.

35 Claims, 5 Drawing Sheets

Related U.S. Application Data continuation of application No. PCT/CN2017/084373, filed on May 15, 2017.

(51) Int. Cl.
*H04L 47/122* (2022.01)
*H04L 45/64* (2022.01)
*H04L 69/329* (2022.01)

(52) U.S. Cl.
CPC ............ *H04L 47/122* (2013.01); *H04L 45/64* (2013.01); *H04L 69/329* (2013.01)

(56) References Cited

U.S. PATENT DOCUMENTS

| | | | | |
|---|---|---|---|---|
| 10,715,430 | B2* | 7/2020 | Wang | H04L 45/54 |
| 2003/0016672 | A1* | 1/2003 | Rosen | H04L 63/0272 |
| | | | | 370/392 |
| 2006/0164995 | A1* | 7/2006 | Djernaes | H04L 45/306 |
| | | | | 370/238 |
| 2008/0101234 | A1* | 5/2008 | Nakil | H04L 63/1425 |
| | | | | 370/252 |
| 2009/0185494 | A1* | 7/2009 | Li | H04L 45/02 |
| | | | | 370/389 |
| 2010/0132028 | A1* | 5/2010 | Wang | H04L 63/0236 |
| | | | | 726/11 |
| 2010/0220736 | A1* | 9/2010 | Mohapatra | H04L 45/04 |
| | | | | 370/401 |
| 2011/0013640 | A1* | 1/2011 | Farkas | H04L 45/22 |
| | | | | 370/395.53 |
| 2011/0286466 | A1* | 11/2011 | Ge | H04L 45/741 |
| | | | | 370/401 |
| 2013/0070753 | A1* | 3/2013 | Sahni | H04L 45/021 |
| | | | | 370/351 |
| 2013/0094350 | A1* | 4/2013 | Mandal | H04L 41/12 |
| | | | | 370/400 |
| 2013/0117449 | A1* | 5/2013 | Hares | H04L 45/04 |
| | | | | 709/225 |
| 2013/0148666 | A1* | 6/2013 | Shimonishi | H04L 45/72 |
| | | | | 370/400 |
| 2013/0259058 | A1* | 10/2013 | Vairavakkalai | H04L 45/04 |
| | | | | 370/401 |
| 2014/0025970 | A1* | 1/2014 | Shinohara | G06F 1/3234 |
| | | | | 713/320 |
| 2014/0086253 | A1* | 3/2014 | Yong | H04L 49/70 |
| | | | | 370/395.53 |
| 2014/0289424 | A1* | 9/2014 | Gao | H04L 45/28 |
| | | | | 709/238 |
| 2015/0003458 | A1* | 1/2015 | Li | H04L 45/507 |
| | | | | 370/392 |
| 2015/0009809 | A1* | 1/2015 | Zhang | H04L 47/32 |
| | | | | 370/230 |
| 2015/0236900 | A1* | 8/2015 | Chung | H04L 45/586 |
| | | | | 709/221 |
| 2015/0281079 | A1* | 10/2015 | Fan | H04L 12/6418 |
| | | | | 370/392 |
| 2015/0334024 | A1* | 11/2015 | Mogul | H04L 47/24 |
| | | | | 370/237 |
| 2015/0350056 | A1* | 12/2015 | He | H04L 45/02 |
| | | | | 370/392 |
| 2017/0026270 | A1* | 1/2017 | Handige Shankar | H04L 43/04 |
| 2017/0104672 | A1* | 4/2017 | Liang | H04L 49/3009 |
| 2018/0048593 | A1* | 2/2018 | Tian | H04L 41/0895 |

FOREIGN PATENT DOCUMENTS

| | | |
|---|---|---|
| CN | 101212420 A | 7/2008 |
| CN | 101252523 A | 8/2008 |
| CN | 101404612 A | 4/2009 |
| CN | 101582846 A | 11/2009 |
| CN | 101978658 A | 2/2011 |
| CN | 102447639 A | 5/2012 |
| CN | 102946354 A | 2/2013 |
| CN | 103874157 A | 6/2014 |
| CN | 2963866 A2 | 1/2016 |
| EP | 2963866 A2 | 1/2016 |

OTHER PUBLICATIONS

Uttaro, J., et al., "BGP Flow-Spec Redirect to IP Action," draft-ietf-idr-flowspec-redirect-ip-02, Feb. 2, 2015, 9 pages.
Raszuk, R., et al., "Registered Wide BGP Community Values," draft-ietf-idr-registered-wide-bgp-communities-01, Nov. 20, 2015, 18 pages.
Raszuk, R., et al., "Wide BGP Communities Attribute," draft-ietf-idr-wide-bgp-communities-01, Nov. 20, 2015, 23 pages.
Marques, P., et al., "Dissemination of Flow Specification Rules," Network Working Group, RFC5575, Aug. 2009, 22 pages.
"Open Flow Switch Specification", Open Networking Foundation, Sep. 27, 2013, XP055176059, 164 pages.

* cited by examiner

DATA FLOW REDIRECTION METHOD AND SYSTEM, NETWORK DEVICE, AND CONTROL DEVICE

CROSS-REFERENCE TO RELATED APPLICATIONS

This application is a continuation of U.S. patent application Ser. No. 16/195,103, filed on Nov. 19, 2018, which is a continuation of International Patent Application No. PCT/CN2017/084373 filed on May 15, 2017, which claims priority to Chinese Patent Application No. 201610332658.1 filed on May 18, 2016. All of the aforementioned applications are hereby incorporated by reference in their entireties.

TECHNICAL FIELD

The present disclosure relates to the communications field, and in particular, to a data flow redirection method and system, a network device, and a control device.

BACKGROUND

Software-defined networking (SDN) includes a control device and a forwarding device. The forwarding device may be a network device such as a router or a switch. The control device may be configured to control network traffic. The forwarding device is configured to perform forwarding processing on a received data packet. Further, the forwarding device may query a forwarding information base (FIB) according to a destination Internet Protocol (IP) address of the received data packet, and forward the data packet according to an outbound interface in a forwarding entry matching the destination IP address in the FIB. However, in some cases, a user expects to intervene in a data packet passing through the forwarding device, for example, to suppress a message that has a specific source IP address and that is for accessing a destination IP address, or discard corresponding data. In this case, a flow specification (Also referred to as FlowSpec) forwarding table that includes at least one flow specification may be set on the forwarding device. The flow specification may include a flow matching condition and an action performed on a matching flow. The flow matching condition may include a destination IP address, a source IP address, a destination port, and the like. The action may include discarding, redirection to a specific port, and the like. In this way, when receiving a data packet, the forwarding device may first query the flow specification forwarding table. If the flow specification forwarding table has a flow specification matching the data packet, the forwarding device may perform a corresponding action in the matching flow specification. Subsequently, if the data packet needs to be forwarded, the forwarding device may continue to query the FIB in order to determine an outbound interface for the data packet.

In other approaches, when a router carries relatively heavy loads because a relatively large quantity of flows pass through the forwarding device, the flows passing through the forwarding device may be adjusted to another path. Further, the control device may deliver a flow specification to the router. The flow specification instructs to redirect a next hop of a specific flow to another forwarding device. After receiving the flow specification delivered by the control device, the forwarding device may add the flow specification to a flow specification forwarding table of the forwarding device, and perform, according to the flow specification forwarding table, redirection processing on a flow that meets a condition.

However, the flow specification forwarding table usually has relatively small space. This limits a quantity of flows that can be adjusted by the forwarding device.

SUMMARY

Embodiments of the present disclosure provide a data flow redirection method and system, a network device, and a control device in order to overcome a disadvantage that a quantity of adjustable data flows is relatively small due to limited space of a flow specification forwarding table.

According to a first aspect, a data flow redirection method is provided, including receiving, by a network device, a control message sent by a control device, where the control message carries redirection routing information of a data flow and a redirection routing indication, the redirection routing information of the data flow includes destination address information of the data flow and redirection next hop information of the network device, the redirection routing indication is used to instruct to convert the redirection routing information of the data flow into a forwarding entry in a target forwarding table, and tablespace of the target forwarding table is greater than tablespace of a flow specification forwarding table of the network device, and converting, by the network device, the redirection routing information of the data flow into the forwarding entry in the target forwarding table according to the redirection routing indication.

Optionally, the redirection next hop information of the network device may be used to represent information about a Border Gateway Protocol (BGP) next hop that is corresponding to the network device and that is on a routing path obtained after redirection of the data flow.

Optionally, the BGP next hop corresponding to the network device may be directly or indirectly connected to the network device.

Optionally, the redirection next hop information of the network device may include an IP address of a redirection next hop (that is, the BGP next hop) of the network device.

According to the data flow redirection method provided in this embodiment of the present disclosure, the control device sends the control message to the network device, where the control message carries the redirection routing information of the data flow and the redirection routing indication. The redirection routing indication is used to instruct the network device to convert the redirection routing information of the data flow into the forwarding entry in the target forwarding table. The network device converts the redirection routing information of the data flow into the forwarding entry in the target forwarding table according to the redirection routing indication, where the tablespace of the target forwarding table is greater than the tablespace of the flow specification forwarding table. Therefore, a disadvantage that the network device is limited by a size of the flow specification forwarding table when adding the redirection routing information of the data flow to the flow specification forwarding table is resolved in order to increase a quantity of adjustable data flows in a system.

Optionally, the target forwarding table is an FIB.

Optionally, the control message is a BGP FlowSpec message.

In a first possible implementation of the first aspect, the redirection routing indication includes a conversion indication and a conversion description, the conversion indication is used to instruct to perform conversion processing on the redirection routing information of the data flow, and the conversion description is used to describe that the conversion processing is to convert the redirection routing information of the data flow into the forwarding entry in the forwarding table.

With reference to the foregoing possible implementation, in a second possible implementation of the first aspect, in the target forwarding table, the forwarding entry into which the redirection routing information of the data flow is converted includes a destination address corresponding to the destination address information and forwarding next hop information corresponding to the redirection next hop information.

In this case, optionally, the redirection routing indication further includes a conversion manner that instructs to convert the redirection next hop information into the forwarding next hop information.

Further, the redirection routing indication is further used to indicate the conversion manner of converting the redirection next hop information into the forwarding next hop information.

The redirection routing indication may include a conversion manner indication. The conversion manner indication is used to indicate the conversion manner of converting the redirection next hop information into the forwarding next hop information.

With reference to the foregoing possible implementations, in a third possible implementation of the first aspect, the conversion manner that is indicated in the redirection routing indication (or the conversion manner indication in the redirection routing indication) and that is of converting the redirection next hop information into the forwarding next hop information includes converting the redirection next hop information into the forwarding next hop information by querying a routing information base (also referred to as RIB) of the network device, or converting the redirection next hop information into the forwarding next hop information by querying a flow specification routing table of the network device, or first querying a flow specification routing table of the network device, and when the flow specification routing table does not have a routing entry matching the redirection next hop information, converting the redirection next hop information into the forwarding next hop information by querying a routing information base of the network device.

With reference to the foregoing possible implementations, in a fourth possible implementation of the first aspect, if the control message is the BGP FlowSpec message, a traffic action field in an extended community attribute of the BGP FlowSpec message is used to carry the conversion indication.

Further, the traffic action field in the extended community attribute may be used to carry the conversion indication. Optionally, the conversion indication may occupy 1 bit in the traffic action field.

With reference to the foregoing possible implementations, in a fifth possible implementation of the first aspect, if the control message is the BGP FlowSpec message, a community field in a wide community attribute of the BGP FlowSpec message is used to carry the conversion description.

With reference to the foregoing possible implementations, in a sixth possible implementation of the first aspect, if the control message is the BGP FlowSpec message, the wide community attribute of the BGP FlowSpec message includes a parameter type-length-value (TLV), the parameter TLV includes a flag TLV, and the flag TLV is used to indicate the conversion manner of converting the redirection next hop information into the forwarding next hop information.

Further, the BGP FlowSpec message may include a parameter TLV of a flag type. The parameter TLV of the flag type is used to carry the conversion manner indication in the redirection routing indication.

With reference to the foregoing possible implementations, in a seventh possible implementation of the first aspect, the converting, by the network device, the redirection routing information of the data flow into the forwarding entry in the target forwarding table according to the redirection routing indication includes determining, by the network device, the destination address corresponding to the destination address information of the data flow, converting, by the network device, the redirection next hop information of the network device into the forwarding next hop information, and adding, by the network device to the target forwarding table of the network device, the forwarding entry that includes the destination address and the forwarding next hop information.

Optionally, if the control message is the BGP FlowSpec message, an MP_REACH_NLRI field in the BGP FlowSpec message is used to carry the destination address information of the data flow.

In this case, the network device may further obtain the destination address information of the data flow from the MP_REACH_NLRI field in the BGP FlowSpec message, and determine the destination address corresponding to the destination address information as a destination address in the forwarding entry obtained after conversion.

Optionally, a prefix field in the MP_REACH_NLRI field includes only a destination prefix type.

Optionally, if the control message is the BGP FlowSpec message, the extended community attribute of the BGP FlowSpec message may include a Redirect to IP field. The Redirect to IP field may be used to carry the redirection next hop information of the network device.

In this case, the network device may further obtain the redirection next hop information of the network device from the Redirect to IP field in the extended community attribute, determine the forwarding next hop information corresponding to the obtained redirection next hop information, and determine the determined forwarding next hop information as forwarding next hop information in the forwarding entry obtained after conversion.

Optionally, the redirection routing indication is further used to indicate the conversion manner of converting the redirection next hop information into the forwarding next hop information. The network device may convert the redirection next hop information into the forwarding next hop information according to the conversion manner indicated in the redirection routing indication.

Optionally, the network device may query the routing information base, to determine whether the routing information base has the routing entry matching the redirection next hop information, and determine the forwarding next hop information according to the matching routing entry.

Optionally, the network device may query the flow specification routing table to determine whether the flow specification routing table has the routing entry matching the redirection next hop information, and determine the forwarding next hop information according to the matching routing entry.

Optionally, the network device may first query the flow specification routing table of the network device, to determine whether the flow specification routing table has the routing entry matching the redirection next hop information. If the flow specification routing table does not have the routing entry matching the redirection next hop information, the network device may convert the redirection next hop information into the forwarding next hop information by querying the routing information base of the network device.

Optionally, the forwarding next hop information may include an IP address of the forwarding next hop and/or an outbound interface that is corresponding to the forwarding next hop and that is on the network device, and the like.

With reference to the foregoing possible implementations, in an eighth possible implementation of the first aspect, adding, by the network device to the target forwarding table of the network device, the forwarding entry that includes the determined destination address and the determined forwarding next hop information includes, if the target forwarding table of the network device has a target forwarding entry including the destination address, replacing, by the network device, forwarding next hop information in the target forwarding entry with the forwarding next hop information corresponding to the redirection next hop information, and/or if the target forwarding table of the network device does not have a target forwarding entry including the destination address, creating, by the network device in the target forwarding table, the forwarding entry that includes the determined destination address and the determined forwarding next hop information.

With reference to the foregoing possible implementations, in a ninth possible implementation of the first aspect, before receiving, by a network device, a control message sent by a control device, the method further includes sending, by the network device, first capability information to the control device, where the first capability information is used to indicate that the network device has a capability of receiving the redirection routing indication, and receiving, by the network device, second capability information sent by the control device, where the second capability information is used to indicate that the control device has a capability of sending the redirection routing indication, and receiving, by a network device, a control message sent by a control device includes receiving, by the network device, the control message that is sent by the control device according to the first capability information.

With reference to the foregoing possible implementations, in a tenth possible implementation of the first aspect, sending, by the network device, first capability information to the control device includes sending, by the network device, a first BGP OPEN message to the control device, where the first BGP OPEN message carries the first capability information, and receiving, by the network device, second capability information sent by the control device includes receiving, by the network device, a second BGP OPEN message sent by the control device, where the second BGP OPEN message carries the second capability information.

With reference to the foregoing possible implementations, in an eleventh possible implementation of the first aspect, the method further includes setting, to a highest priority, a priority of the forwarding entry into which the redirection routing information of the data flow is converted.

According to a second aspect, another data flow redirection method is provided, including determining, by a control device, redirection routing information of a data flow, where the redirection routing information of the data flow includes destination address information of the data flow and redirection next hop information of a target network device, and sending, by the control device, a control message to the target network device, where the control message carries the redirection routing information of the data flow and a redirection routing indication, the redirection routing indication is used to instruct to convert the redirection routing information of the data flow into a forwarding entry in a target forwarding table, and tablespace of the target forwarding table is greater than tablespace of a flow specification forwarding table of the target network device.

Optionally, the target forwarding table is an FIB.

Optionally, the control message is a BGP FlowSpec message.

In a first possible implementation of the second aspect, the redirection routing indication includes a conversion indication and a conversion description, the conversion indication is used to instruct to perform conversion processing on the redirection routing information of the data flow, and the conversion description is used to describe that the conversion processing is to convert the redirection routing information of the data flow into the forwarding entry in the forwarding table.

With reference to the foregoing possible implementation, in a second possible implementation of the second aspect, in the target forwarding table, the forwarding entry into which the redirection routing information of the data flow is converted includes a destination address corresponding to the destination address information and forwarding next hop information corresponding to the redirection next hop information.

In this case, optionally, the redirection routing indication further includes a conversion manner that instructs to convert the redirection next hop information into the forwarding next hop information.

Further, the redirection routing indication is further used to indicate the conversion manner of converting the redirection next hop information into the forwarding next hop information.

The redirection routing indication may include a conversion manner indication. The conversion manner indication is used to indicate the conversion manner of converting the redirection next hop information into the forwarding next hop information.

With reference to the foregoing possible implementations, in a third possible implementation of the second aspect, the conversion manner that is indicated in the redirection routing indication (or the conversion manner indication in the redirection routing indication) and that is of converting the redirection next hop information into the forwarding next hop information includes converting the redirection next hop information into the forwarding next hop information by querying a routing information base of the network device, converting the redirection next hop information into the forwarding next hop information by querying a flow specification routing table of the network device, or first querying a flow specification routing table of the network device, and when the flow specification routing table does not have a routing entry matching the redirection next hop information, converting the redirection next hop information into the forwarding next hop information by querying a routing information base of the network device.

With reference to the foregoing possible implementations, in a fourth possible implementation of the second aspect, if the control message is a BGP FlowSpec message, a traffic action field in an extended community attribute of the BGP FlowSpec message is used to carry the conversion indication.

Further, the traffic action field in the extended community attribute may be used to carry the conversion indication. Optionally, the conversion indication may occupy 1 bit in the traffic action field.

With reference to the foregoing possible implementations, in a fifth possible implementation of the second aspect, if the control message is a BGP FlowSpec message, a community field in a wide community attribute of the BGP FlowSpec message is used to carry the conversion description.

With reference to the foregoing possible implementations, in a sixth possible implementation of the second aspect, if the control message is the BGP FlowSpec message, the wide community attribute of the BGP FlowSpec message includes a parameter TLV, the parameter TLV includes a flag TLV, and the flag TLV is used to indicate the conversion manner of converting the redirection next hop information into the forwarding next hop information.

Optionally, if the control message is the BGP FlowSpec message, an MP_REACH_NLRI field in the BGP FlowSpec message is used to carry the destination address information of the data flow.

Optionally, if the control message is the BGP FlowSpec message, the extended community attribute of the BGP FlowSpec message may include a Redirect to IP field. The Redirect to IP field may be used to carry the redirection next hop information of the network device.

With reference to the foregoing possible implementations, in a seventh possible implementation of the second aspect, before sending, by the control device, a control message to the target network device, the method further includes receiving, by the control device, first capability information sent by the target network device, where the first capability information is used to indicate that the network device has a capability of receiving the redirection routing indication, and sending, by the control device, second capability information to the target network device, where the second capability information is used to indicate that the control device has a capability of sending the redirection routing indication, and sending, by the control device, a control message to the target network device includes sending, by the control device, the control message to the target network device according to the received first capability information.

With reference to the foregoing possible implementations, in an eighth possible implementation of the second aspect, receiving, by the control device, first capability information sent by the target network device includes receiving, by the control device, a first BGP OPEN message sent by the target network device, where the first BGP OPEN message carries the first capability information, and sending, by the control device, second capability information to the target network device includes sending, by the control device, a second BGP OPEN message to the target network device, where the second BGP OPEN message carries the second capability information.

According to a third aspect, a network device is provided and is configured to perform the method in any one of the first aspect or the possible implementations of the first aspect.

According to a fourth aspect, a control device is provided and is configured to perform the method in any one of the second aspect or the possible implementations of the second aspect.

According to a fifth aspect, another network device is provided, including a storage unit and a processor. The storage unit is configured to store an instruction, and the processor is configured to execute the instruction stored in the storage unit. When the processor executes the instruction stored in the memory, the execution enables the processor to perform the method in any one of the first aspect or the possible implementations of the first aspect.

According to a sixth aspect, another control device is provided, including a storage unit and a processor. The storage unit is configured to store an instruction, and the processor is configured to execute the instruction stored in the storage unit. When the processor executes the instruction stored in the storage unit, the execution enables the processor to perform the method in any one of the second aspect or the possible implementations of the second aspect.

According to a seventh aspect, a computer-readable medium is provided and is configured to store a computer program. The computer program includes an instruction used to perform the method in any one of the first aspect or the possible implementations of the first aspect.

According to an eighth aspect, another computer-readable medium is provided and is configured to store a computer program. The computer program includes an instruction used to perform the method in any one of the second aspect or the possible implementations of the second aspect.

According to a ninth aspect, a data flow redirection system is provided, including the network device in any one of the third aspect or the possible implementations of the third aspect and the control device in any one of the fourth aspect or the possible implementations of the fourth aspect. Alternatively, the system includes the network device in any one of the fifth aspect or the possible implementations of the fifth aspect and the control device in any one of the sixth aspect or the possible implementations of the sixth aspect.

BRIEF DESCRIPTION OF DRAWINGS

To describe the technical solutions in some of the embodiments of the present disclosure more clearly, the following briefly describes the accompanying drawings describing some of the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
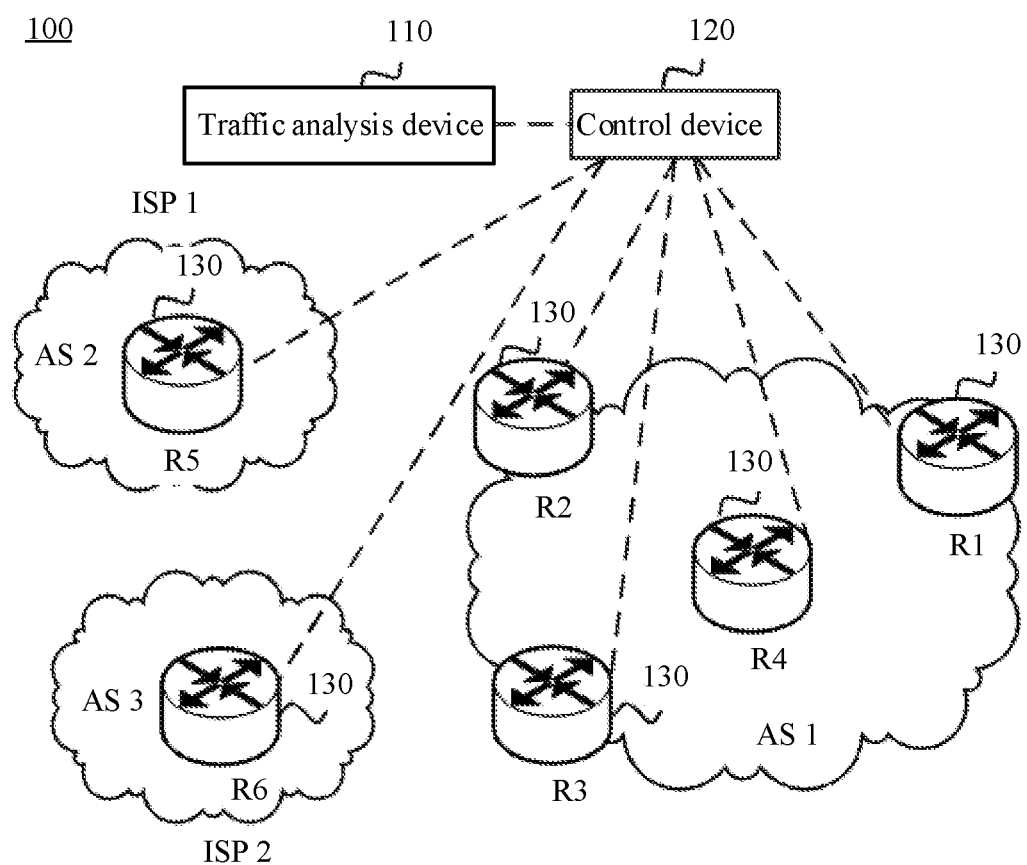
FIG. 1 is a schematic architectural diagram of an applied system according to an embodiment of the present disclosure.

FIG. 1 shows an example of SDN 100 applied in an embodiment of the present disclosure. The SDN 100 includes a traffic analysis device 110, a control device 120, and a plurality of routers 130. The traffic analysis device 110 is configured to collect network traffic information. Optionally, the traffic analysis device 110 may be a uTraffic. The control device 120 may be configured to control network traffic based on the traffic information from the traffic analysis device 110. Optionally, the control device 120 may be a smart network controller (SNC). This embodiment of the present disclosure is not limited thereto.

The routers 130 may be configured to perform forwarding processing on a data flow. FIG. 1 shows an example of six routers, R1 to R6. R1 to R4 belong to an autonomous system (AS) 1. R5 belongs to an AS 2 for which an Internet service provider (ISP) 1 provides a service. R6 belongs to an AS 3 for which an ISP 2 provides a service. It should be understood that FIG. 1 shows one control device and six routers only as an example. The SDN 100 may include any another quantity of control devices and routers. This is not limited in this embodiment of the present disclosure.

In the example shown in FIG. 1, it is assumed that a destination address of a service accessed by R1 is D, and there may be two paths of X and Y from R1 to D. The path X successively passes through R1, R2, and R5. The path Y successively passes through R1, R2, and R6. It is assumed that a route priority of X is higher than that of Y. When receiving a data packet with the destination address D from R1, R2 uses the path X to forward the data packet. However, for R2, bandwidth used to connect X to Y is limited, and therefore, a link of X may be heavily loaded because of excessive traffic. In this case, it is necessary to offload, onto the path Y, some traffic that originally needs to flow through the path X.

Further, the control device 120 may obtain, using the traffic information from the traffic analysis device 110, an adjusted path of a specific flow that needs to be adjusted and adjusted BGP next hop information corresponding to one or more routers on the path of the specific flow. The control device 120 may deliver a flow specification to a related router, and specify, in the flow specification, an adjusted BGP next hop corresponding to the router. This embodiment of the present disclosure is not limited thereto.

In the other approaches, after receiving the flow specification sent by the control device, the router may store the flow specification in a flow specification forwarding table of the router, and perform, according to the flow specification forwarding table, redirection processing on a received data flow that meets the flow specification. However, a flow specification forwarding table of an existing forwarding device has relatively small tablespace, generally 32 kilobytes (KB), 64 KB, 96 KB, or the like. Consequently, a quantity of data flows that can be adjusted by the forwarding device is limited.

It should be understood that, in this embodiment of the present disclosure, the network device may be a routing and forwarding device such as a conventional router or switch in a conventional path computation element (PCE) network, or may be a routing and forwarding device such as a router or a switch in SDN based on separated control and forwarding. This is not limited in this embodiment of the present disclosure.

Figure 2:
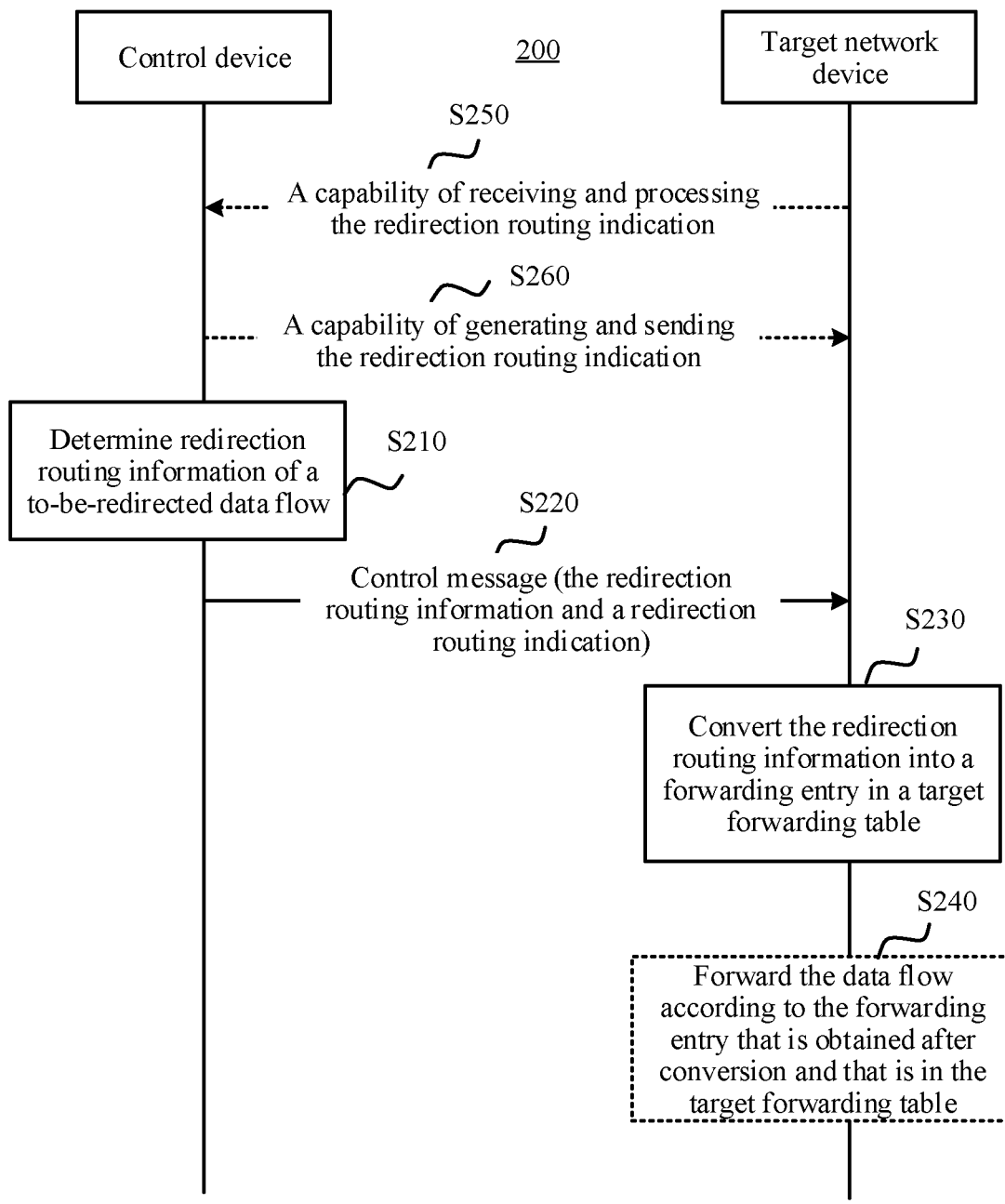
FIG. 2 is a schematic flowchart of a data flow redirection method according to an embodiment of the present disclosure.

FIG. 2 shows an example of a data flow redirection method 200 according to an embodiment of the present disclosure. The method 200 may be applied to the SDN 100 shown in FIG. 1. This embodiment of the present disclosure is not limited thereto.

Step S210. A control device determines redirection routing information of a to-be-redirected data flow.

In an optional example, the control device may be SNC. This is not limited in this embodiment of the present disclosure. The control device may obtain network traffic information, for example, obtain traffic information from a traffic analysis device, and determine, according to the obtained traffic information, the data flow that needs to be redirected and the redirection routing information of the data flow. For example, in the example shown in FIG. 1, when the control device finds, according to the traffic information, that a link from R2 to R5 is relatively heavily loaded currently, it may be determined that some data flows on the link from R2 to R5 are offloaded onto another link. For example, a routing path of a specific data flow is adjusted from X to Y.

The redirection routing information of the data flow may include information about a redirection path (that is, an adjusted routing path) of the data flow in order to perform redirection processing on the data flow. Further, the redirection routing information of the data flow may include destination address information of the data flow and redirection next hop information of a target network device. The destination address information of the data flow may include a destination IP address of the data flow, and the like. The redirection next hop information of the target network device may represent information about a redirection next hop corresponding to the target network device, for example, an IP address of the redirection next hop. The redirection next hop corresponding to the target network device may be a BGP next hop that is corresponding to the target network device and that is on the adjusted routing path of the data flow. The redirection next hop corresponding to the target network device may be directly or indirectly connected to the target network device, and may belong to an AS that is the same as or different from an AS to which the target network device belongs. This is not limited in this embodiment of the present disclosure.

The target network device may be a network device on the routing path of the data flow. A next hop of the target network device needs to be adjusted when the data flow is redirected. For example, the target network device may be R2 in the foregoing example. Optionally, there may be one or more target network devices. If there are a plurality of target network devices, each of the plurality of target network devices may be corresponding to a different redirection next hop. Correspondingly, the control device may determine redirection next hop information corresponding to each of the plurality of target network devices. This embodiment of the present disclosure is not limited thereto.

Optionally, the redirection routing information of the data flow may further include other information. This is not limited in this embodiment of the present disclosure.

Step S220. The control device sends a control message to the target network device, where the control message may include the redirection routing information of the data flow and a redirection routing indication, the redirection routing indication is used to convert the redirection routing information of the data flow into a forwarding entry in a target forwarding table, and tablespace of the target forwarding table is greater than tablespace of a flow specification forwarding table of the target network device.

Optionally, the control message may be a BGP Flow Specification message or another type of message. This embodiment of the present disclosure is not limited thereto.

Optionally, if there are a plurality of target network devices, the control device may send the control message to each of the plurality of target network devices. Redirection next hop information that is of the data flow and that is carried in the control message sent to each target network device may include the destination address information of the data flow and redirection next hop information of each target network device. This embodiment of the present disclosure is not limited thereto.

In an optional example, the redirection routing indication may include a conversion indication and a conversion description. The conversion indication is used to instruct to perform conversion processing on the redirection routing information of the data flow. The conversion description may be used to describe or explain the conversion processing action. For example, the conversion description is used to describe that the conversion processing is to convert the redirection routing information of the data flow into the forwarding entry in the target forwarding table. In this case, the conversion description is used to limit the conversion processing indicated in the conversion indication to converting the redirection routing information of the data flow into the forwarding entry in the target forwarding table. This embodiment of the present disclosure is not limited thereto.

The redirection routing indication may be used to instruct the target network device to convert the redirection routing information of the data flow into the forwarding entry in the target forwarding table. The target forwarding table may be used by the target network device to perform forwarding processing on a received data flow. For example, the target forwarding table may be an FIB. This embodiment of the present disclosure is not limited thereto.

Step S230. The target network device receives the control message sent by the control device, and converts the redirection routing information of the data flow into the forwarding entry in the target forwarding table according to the control message.

Optionally, if the redirection routing indication includes the conversion indication and the conversion description, the target network device may further convert the redirection routing information of the data flow into the forwarding entry in the target forwarding table according to the conversion indication and the conversion description.

The target forwarding table of the target network device may include at least one forwarding entry. Optionally, each forwarding entry may include a destination address and forwarding next hop information, for example, an outbound interface that is corresponding to the forwarding next hop and that is on the target network device and an IP address of the forwarding next hop. The forwarding next hop may be directly connected to the target network device, and the target network device may be further connected to the forwarding next hop using the outbound interface that is corresponding to the forwarding next hop and that is on the target network device. This embodiment of the present disclosure is not limited thereto.

Optionally, in this embodiment of the present disclosure, a manner in which the target network device converts the redirection routing information of the data flow into the forwarding entry in the target forwarding table may be predefined, or may be preconfigured by the control device. Alternatively, the control device may indicate, in the control message, a manner in which the target network device converts the redirection routing information of the data flow into the forwarding entry in the target forwarding table.

In an optional example, if the forwarding entry in the target forwarding table includes the destination address and the forwarding next hop information, that the target network device converts the redirection routing information of the data flow into the forwarding entry in the target forwarding table may include the following. The target network device uses a destination address corresponding to the destination address information of the data flow as the destination address in the forwarding entry obtained after conversion, and the target network device converts the redirection next hop information of the target network device into forwarding next hop information, and uses the forwarding next hop information as the forwarding next hop information in the forwarding entry obtained after conversion.

Optionally, a conversion manner in which the target network device converts the redirection next hop information of the target network device into the forwarding next hop information may be predefined, or may be preconfigured by the control device. Alternatively, the control device may indicate, in the control message, a conversion manner in which the target network device converts the redirection next hop information of the target network device into the forwarding next hop information. For example, the redirection routing indication is further used to indicate the conversion manner of converting the redirection next hop information of the target network device into the forwarding next hop information.

In this case, the target network device may convert the redirection next hop information of the target network device into the forwarding next hop information according to the conversion manner indicated in the redirection routing indication. This embodiment of the present disclosure is not limited thereto.

In an optional example, the redirection routing indication may further include a conversion manner indication. The conversion manner indication may be used to indicate the conversion manner of converting the redirection next hop information of the target network device into the forwarding next hop information. This embodiment of the present disclosure is not limited thereto.

In an optional example, the target network device may convert the redirection next hop information of the target network device into the forwarding next hop information in any one of the following conversion manners.

(1) Convert the redirection next hop information of the target network device into the forwarding next hop information by querying a RIB of the target network device.

Optionally, the RIB may belong to a control plane of the target network device. The RIB may further include a routing table generated by the target network device according to the BGP, or may include a Virtual Private Network (VPN) routing table generated by the target network device according to an Interior Gateway Protocol (IGP) or the VPN Protocol. This is not limited in this embodiment of the present disclosure.

Further, the target network device may determine whether the RIB has a routing entry matching the redirection next hop information, and determine, according to information in the matching routing entry, the forwarding next hop information corresponding to the redirection next hop information. This embodiment of the present disclosure is not limited thereto.

(2) Convert the redirection next hop information of the target network device into the forwarding next hop information by querying a flow specification routing table of the target network device.

The flow specification routing table may be a routing table that includes a flow specification, and may optionally belong to a control plane of the target network device. Further, the target network device may determine whether the flow specification routing table has a routing entry matching the redirection next hop information, and determine, according to information in the matching routing entry, the forwarding next hop information corresponding to the redirection next hop information. This embodiment of the present disclosure is not limited thereto.

(3) First query a flow specification routing table of the target network device to determine whether the flow specification routing table has a routing entry matching the redirection next hop information of the target network device, and when the flow specification routing table does not have the routing entry matching the redirection next hop information of the target network device, convert the redirection next hop information of the target network device into the forwarding next hop information by querying a routing information base of the target network device.

The target network device may first determine whether the flow specification routing table has the routing entry matching the redirection next hop information of the target network device. If the flow specification routing table has the matching routing entry, the target network device may determine, according to information in the matching routing entry, the forwarding next hop information corresponding to the redirection next hop information of the target network device. If the flow specification routing table does not have the matching routing entry, the target network device may query the RIB table to determine whether the RIB has the routing entry matching the redirection next hop information of the target network device. This embodiment of the present disclosure is not limited thereto.

Optionally, the control message may instruct the target network device to convert the redirection next hop information of the target network device into the forwarding next hop information in any one of the foregoing three conversion manners. This is not limited in this embodiment of the present disclosure.

Figure 3:
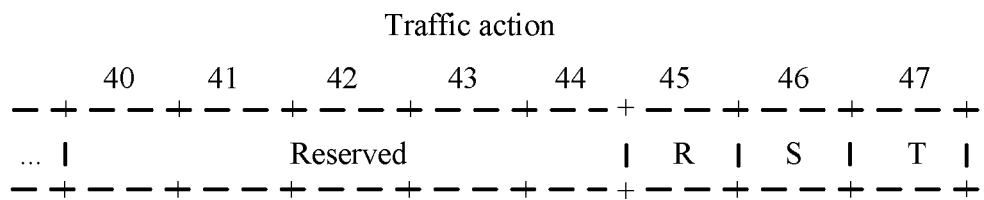
FIG. 3 is a schematic diagram of an example format of a traffic action field of a BGP FlowSpec message in a data flow redirection method according to an embodiment of the present disclosure.

Optionally, if the control message is further a BGP FlowSpec message, the BGP FlowSpec message may include a traffic action field. For example, an extended community attribute in the BGP FlowSpec message includes the traffic action field. The traffic action field may be used to carry the conversion indication. In an example, the traffic action field may include 48 bits. FIG. 3 shows a format of the last byte (including the last eight bits, bits 40 to 47) of the traffic action field. The bit 47 is used to indicate a terminating action (Terminal Action). The bit 46 is used to indicate a sampling (Sample) action. The conversion indication may also be referred to as an RPD, and may occupy any one or more bits of bits 0 to 45 in the traffic action field. In the example shown in FIG. 3, the bit 45 in the traffic action field is used to indicate the RPD action. In this case, bits 0 to 44 in the traffic action field may be reserved. This is not limited in this embodiment of the present disclosure.

Figure 4:
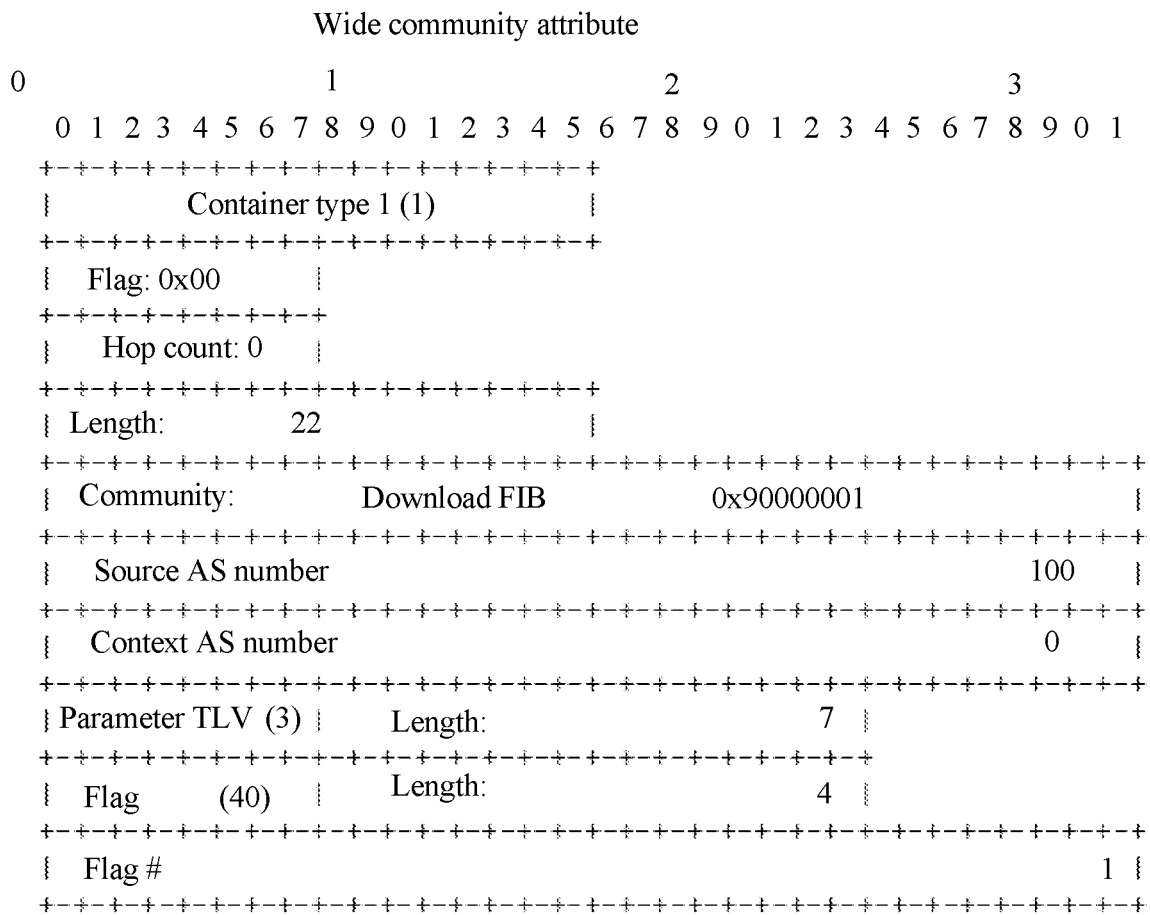
FIG. 4 is a schematic diagram of an example format of a wide community attribute of a BGP FlowSpec message in a data flow redirection method according to an embodiment of the present disclosure.

If the control message is the BGP FlowSpec message, optionally, the BGP FlowSpec message may further include a wide community attribute. In this case, the conversion description may be carried in the wide community attribute. In an optional example, as shown in FIG. 4, the wide community attribute may include a community field. The community field may indicate Download FIB. That is, the community field indicates that the conversion processing is further used to download the redirection routing information of the data flow to the FIB. In the example shown in FIG. 4, when the community field is set to 0x90000001, the community field represents Download FIB. Alternatively, the community field may be corresponding to another value, and may be allocated by an Internet Assigned Numbers Authority (IANA) registry. This is not limited in this embodiment of the present disclosure.

If the redirection routing indication further includes the conversion manner indication, in an optional example, the wide community attribute may be further used to carry the conversion manner indication. As shown in FIG. 4, the wide community attribute may be included in a container type field, a hop count field, a length field, a community field, a source AS number field, a context AS number field, or a parameter TLV field. The hop count field is used to indicate a degree of broadcasting the wide community. For example, setting the hop count field to 0 is used to indicate that a router that requests for receiving the message does not broadcast the wide community. The community field is used to define an action that needs to be performed by the target network device. The source AS number field is used to represent an AS number that originates (Originate) the community. The context AS number field represents an AS context used to explain the community. As shown in FIG. 4, the parameter TLV field includes a type field, a length field, and a value field. In this embodiment of the present disclosure, a new type of parameter TLV is defined, that is, a flag (Flags) TLV. A type field of the flag TLV may be used to carry a type number of the flag TLV. For example, in the example shown in FIG. 4, the type number of the flag TLV is 40. An actual type number of the flag TLV may be allocated and maintained by the IANA registry. This is not limited in this embodiment of the present disclosure. A length field of the flag TLV may be used to indicate a length of the flag TLV, or may be used to indicate a length of a value field of the flag TLV. The value field of the flag TLV may be used to indicate the conversion manner of converting the redirection next hop information of the target network device into the forwarding next hop information, that is, used to indicate a manner of determining the forwarding next hop information corresponding to the redirection next hop information of the target network device.

In an optional example, the flag TLV may be always set in the wide community attribute of the BGP FlowSpec message. If a value of the value field of the flag TLV is set to 1, it may instruct to convert the redirection next hop information of the target network device into the forwarding next hop information by querying the flow specification routing table. Alternatively, if a value of the value field of the flag TLV is set to 0, it may instruct to convert the redirection next hop information of the target network device into the forwarding next hop information by querying a common routing table. In another optional example, if the value of the value field of the flag TLV is set to decimal 2 (corresponding to binary 10), it may be used to instruct to convert the redirection next hop information of the target network device into the forwarding next hop information by first querying the flow specification routing table and then querying the common routing table. In this way, the value field of the flag TLV may be set to different values to indicate the foregoing three conversion manners. In the example shown in FIG. 4, the flag TLV occupies four bytes. This embodiment of the present disclosure is not limited thereto.

In another optional example, the flag TLV may not be always set in the BGP FlowSpec message. In this case, if the flag TLV is set in the wide community attribute of the BGP FlowSpec message, it may instruct to convert the redirection next hop information of the target network device into the forwarding next hop information by querying the flow specification routing table. Alternatively, if the flag TLV is not set in the wide community attribute of the BGP FlowSpec message, it may instruct to convert the redirection next hop information of the target network device into the forwarding next hop information by querying the common routing table.

If the control message is the BGP FlowSpec message, optionally, the BGP FlowSpec message may include a Multiprotocol Reachable Network Layer Reachability Information (NLRI) (MP_REACH_NLRI) field. The MP_REACH_NLRI field may be used to carry the destination address information of the data flow. The MP_REACH_NLRI may belong to a path attribute. In addition, optionally, the MP_REACH_NLRI field may be included in the extended community (Extended Community) attribute of the BGP FlowSpec message. In an optional example, an MP_REACH_NLRI attribute may include one or more triplets <address family information, next hop information, network reachability information>. Correspondingly, the MP_REACH_NLRI field may include an address family information field, a next hop network address information (Next Hop Network Address Information) field, and an NLRI field. Optionally, the address family information field may include a 2-byte address family identifier (AFI) and a 1-byte subsequent AFI (SAFI). The AFI may be used to identify a network layer protocol. The SAFI may be used to identify a type of an NLRI. The next hop network address information field may include a next hop network address. The NLRI field may include a length field, a label field, and a prefix field. The prefix field may be corresponding to different matching conditions, for example, a destination address, a source address, a destination port, a source port, and a message length. Optionally, in this embodiment of the present disclosure, the prefix field may include only one matching condition, the destination address. For example, the prefix field may include only a type 1. Correspondingly, the target network device may obtain the destination address of the data flow from a prefix field in the MP_REACH_NLRI field in the BGP FlowSpec message, and use the obtained destination address as the destination address in the forwarding entry obtained after conversion. This is not limited in this embodiment of the present disclosure.

If the control message is further the BGP FlowSpec message, optionally, the extended community attribute of the BGP FlowSpec message may further include a Redirect to IP field. The Redirect to IP field may include a target address field. The target address field may be used to carry the redirection next hop information of the target network device. In this case, the target network device may obtain the redirection next hop information of the target network device from the target address field in the Redirect to IP field. This embodiment of the present disclosure is not limited thereto.

Optionally, after determining the destination address of the data flow and the forwarding next hop information that is of the data flow and that is corresponding to the target network device, the target network device may add, to the target forwarding table, the forwarding entry that includes the destination address of the data flow and the forwarding next hop information that is of the data flow and that is corresponding to the target network device. Further, the target network device may determine whether the target forwarding table has a forwarding entry matching the destination address of the data flow. If the target forwarding table of the target network device has a forwarding entry matching the destination address of the data flow, that is, the target forwarding table has a forwarding entry that includes the destination address of the data flow, the target network device may replace forwarding next hop information in the matching forwarding entry with the forwarding next hop information that is of the data flow and that is corresponding to the target network device. For example, the router may replace an outbound interface in the matching forwarding entry with the outbound interface corresponding to the forwarding next hop that is of the data flow and that is corresponding to the target network device. Optionally, if the target forwarding table does not have a forwarding entry matching the destination address of the data flow, the target network device may create a new forwarding entry in the target forwarding table. The new forwarding entry includes the destination address of the data flow and the forwarding next hop information that is of the data flow and that is corresponding to the target network device. This embodiment of the present disclosure is not limited thereto.

In another optional embodiment, as shown in FIG. 2, the method 200 may further include step S240.

Step S240. When receiving a data packet with a destination address corresponding to destination address information of the data flow, the target network device forwards the data packet according to the forwarding entry that is obtained after conversion and that is in the target forwarding table.

Further, after the target network device receives the data packet, if the target network device finds that the destination address of the data packet is the same as the destination address in the forwarding entry that is in the target forwarding table and into which the redirection routing information of the data flow is converted, the target network device may forward the data packet according to the forwarding next hop information in the forwarding entry obtained after conversion.

In another optional embodiment, the target network device may further set, to a highest priority, a priority of the forwarding entry into which the redirection routing information of the data flow is converted. In this way, if a BGP or an IGP in a public network also learns a route with a destination address that is the same as the destination address of the data flow, the forwarding entry into which the redirection routing information of the data flow is converted may be delivered to the target forwarding table as an optimal forwarding entry. This is not limited in this embodiment of the present disclosure.

In another optional embodiment, before step S210, the control device may further perform capability negotiation with the target network device in order to confirm whether the target network device supports the redirection routing indication, for example, confirm whether the target network device has an RPD capability. Correspondingly, the method 200 may further include steps S250 and S260.

Step S250. The target network device may send first capability information to the control device. The first capability information is used to indicate that the target network device has a capability of receiving and processing the redirection routing indication, that is, has a capability of converting the redirection routing information of the data flow into the forwarding entry in the target forwarding table. For example, the target network device has an RPD receiving capability.

Figure 5:
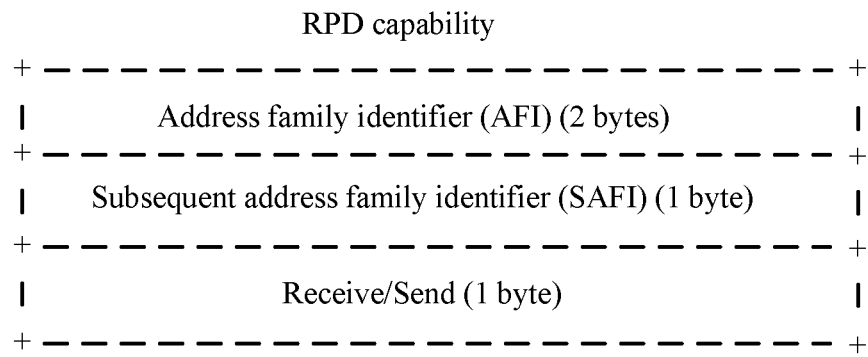
FIG. 5 is a schematic diagram of an example format of a routing policy distribution (RPD) capability field of a BGP OPEN message in a data flow redirection method according to an embodiment of the present disclosure.

Optionally, the target network device may add the first capability information to a BGP OPEN message. In an optional example, a capability code of the redirection routing indication may be set to 129. A capability value field of the redirection routing indication may include an AFI field, an ASFI field, and a Send/Receive field. In an example shown in FIG. 5, the AFI field may occupy 2 bytes, and a value of the AFI field may be set to 1. The ASFI field may occupy 1 byte, and a value of the ASFI field may be set to 133. The Send/Receive field may occupy 1 byte, and is used to indicate an RPD capability further supported by this device. Further, if the Send/Receive field is set to Send, and a value of the Send/Receive field is set to, for example, 2, it may indicate that this device is capable of generating the redirection routing indication, that is, this device has a capability of generating the control message that carries the redirection routing indication. Alternatively, if the Send/Receive field is set to Receive, and a value of the Send/Receive field is set to, for example, 1, it may indicate that this device is capable of receiving and processing the redirection routing indication, that is, this device has a capability of identifying and processing the control message that carries the redirection routing indication. This is not limited in this embodiment of the present disclosure.

Step S260. The control device sends second capability information to the target network device, where the second capability information is used to indicate that the control device has a capability of sending the redirection routing indication.

Optionally, the control device may add the second capability information to a BGP OPEN message. For a specific format of the BGP OPEN message, refer to the foregoing descriptions. For brevity, details are not described herein again.

In this case, the control device may determine, according to the received first capability information, that the target network device has a capability of supporting receiving of the redirection routing indication, and send the control message to the router.

Therefore, according to the data flow redirection method in this embodiment of the present disclosure, the control device sends the control message to the target network device, where the control message carries the redirection routing information of the data flow and the redirection routing indication. The redirection routing indication is used to instruct the target network device to convert the redirection routing information of the data flow into the forwarding entry in the target forwarding table. The target network device converts the redirection routing information of the data flow into the forwarding entry in the target forwarding table according to the redirection routing indication, where the tablespace of the target forwarding table is greater than the tablespace of the flow specification forwarding table. Therefore, a disadvantage that the target network device is limited by a size of the flow specification forwarding table when adding the redirection routing information of the data flow to the flow specification forwarding table is overcome in order to increase a quantity of adjustable flows in a system.

In addition, in the other approaches, because a size of tablespace of a flow specification forwarding table of a network device is limited, a quantity of adjustable data flows in a system is limited. As a result, a control device can perform flow adjustment to a limited extent but cannot continue the flow adjustment, thereby affecting a load balancing effect of the system. According to this embodiment of the present disclosure, the redirection routing information of the data flow is converted into the forwarding entry in the target forwarding table of the network device, and the tablespace of the target forwarding table is greater than the tablespace of the flow specification forwarding table in order to increase the quantity of adjustable data flows in the system, and improve a load balancing effect of the system.

The following describes in detail the data flow redirection method according to the embodiments of the present disclosure with reference to a specific example. For example, in the example shown in FIG. 1, a routing path of a data flow with the destination address D needs to be adjusted from X to Y. It is assumed herein that the control device is the SNC, and the traffic analysis device is the uTraffic. This embodiment of the present disclosure is not limited thereto.

The SNC may establish a BGP peer with routers 1 to 6 (that is, R1 to R6 in FIG. 1) on a forwarding plane. In a BGP peer establishment process, the SNC may send an OPEN message to each router. The OPEN message carries second capability information. The second capability information indicates that the SNC has a capability (that is, a send capability) of generating and sending a redirection routing indication. Correspondingly, each router may send an OPEN message to the SNC. The OPEN message carries first capability information. The first capability information indicates that the router has a capability (that is, a receive capability) of receiving and processing the redirection routing indication.

The SNC may generate a flow adjustment result according to a destination address of a data flow that needs to be adjusted and the redirection next hop R6. A flow adjustment policy for R2 is as follows. A next hop of the data flow with the destination address D is redirected from R5 to R6. The SNC may send a BGP FlowSpec message to R2. The BGP FlowSpec message carries redirection routing information that includes a redirection routing indication in order to instruct R2 to convert the redirection routing information into a forwarding entry in a target forwarding table. Optionally, a prefix field in an MP_REACH_NLRI field in the BGP FlowSpec message may include only a destination prefix. A flag R (that is, a conversion indication) is set in a traffic action field. In addition, the BGP FlowSpec message may carry a wide community attribute. A community field in the attribute may indicate Download FIB. FLAG is set to an iterative public network unicast routing table.

After receiving the BGP FlowSpec message delivered by the SNC, R2 may add, according to the redirection routing indication carried in the BGP FlowSpec message, a forwarding entry corresponding to the redirection routing information in the BGP FlowSpec message to the target forwarding table. Further, R2 may obtain a forwarding next hop and an actual outbound interface of R2 by means of iteration according to the redirection next hop R6 in the BGP FlowSpec message, and then deliver a forwarding entry that includes the destination address (that is, D) and the forwarding next hop to the target forwarding table.

In addition, optionally, after R2 delivers the forwarding entry to the target forwarding table, if R2 learns a route with the same destination prefix from a common public network unicast neighbor, R2 may be compelled to select the forwarding entry into which the redirection routing information is converted.

After R2 receives a user flow with the destination address D, R2 may forward the user flow to R6 according to the forwarding entry that is in the target forwarding table and into which the redirection routing information is converted.

In the foregoing example, an example in which a forwarding path only of R2 needs to be adjusted is described. Optionally, if a plurality of routers whose forwarding paths need to be adjusted exist on a routing path of a data flow that needs to be redirected, the forwarding paths of the plurality of routers may be adjusted in a manner similar to that of adjusting the forwarding path of R2. This is not limited in this embodiment of the present disclosure.

It should be noted that the examples of FIG. 1 and FIG. 3 to FIG. 5 are merely intended to help a person skilled in the art better understand the embodiments of the present disclosure, but are not intended to limit the scope of the embodiments of the present disclosure. A person skilled in the art certainly can make various equivalent modifications or changes according to the examples shown in FIG. 1 and FIG. 3 to FIG. 5, and the modifications or changes also fall within the scope of the embodiments of the present disclosure.

It should be understood that sequence numbers of the foregoing processes do not mean execution sequences. The execution sequences of the processes should be determined according to functions and internal logic of the processes, and should not construct any limitation to the implementation processes of the embodiments of the present disclosure.

The foregoing describes in detail the data flow redirection method according to the embodiments of the present disclosure with reference to FIG. 1 to FIG. 5. The following describes in detail a network device, a control device, and a data flow redirection system according to the embodiments of the present disclosure with reference to FIG. 6 to FIG. 10.

Figure 6:
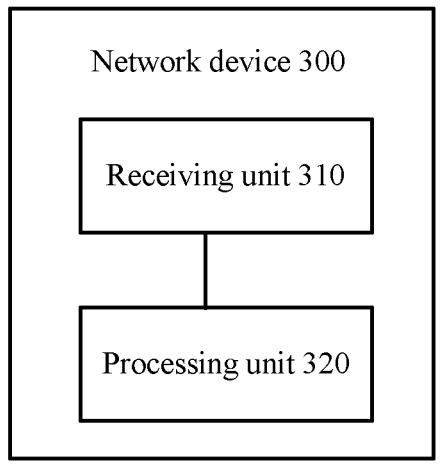
FIG. 6 is a schematic block diagram of a network device according to an embodiment of the present disclosure.

FIG. 6 shows an example of a network device 300 according to an embodiment of the present disclosure. The network device 300 includes a receiving unit 310 configured to receive a control message sent by a control device, where the control message carries redirection routing information of a data flow and a redirection routing indication, the redirection routing information of the data flow includes destination address information of the data flow and redirection next hop information of the network device, the redirection routing indication is used to instruct to convert the redirection routing information of the data flow into a forwarding entry in a target forwarding table, and tablespace of the target forwarding table is greater than tablespace of a flow specification forwarding table of the network device, and a processing unit 320 configured to convert the redirection routing information of the data flow into the forwarding entry in the target forwarding table according to the redirection routing indication received by the receiving unit 310.

Optionally, the redirection routing indication includes a conversion indication and a conversion description. The conversion indication is used to instruct to perform conversion processing on the redirection routing information of the data flow. The conversion description is used to describe that the conversion processing is to convert the redirection routing information of the data flow into the forwarding entry in the forwarding table.

In this case, the processing unit 320 may further convert the redirection routing information of the data flow into the forwarding entry in the target forwarding table according to the conversion indication and the conversion description.

Optionally, the target forwarding table may be an FIB. This embodiment of the present disclosure is not limited thereto.

Optionally, in the target forwarding table, the forwarding entry into which the redirection routing information of the data flow is converted includes a destination address corresponding to the destination address information and forwarding next hop information corresponding to the redirection next hop information.

In this case, optionally, the redirection routing indication is further used to indicate a conversion manner of converting the redirection next hop information into the forwarding next hop information.

For example, the redirection routing indication may further include a conversion manner indication. The conversion manner indication may be used to indicate the conversion manner of converting the redirection next hop information of the network device into the forwarding next hop information.

Optionally, the conversion manner indicated in the redirection routing indication may include any one of the following three conversion manners, converting the redirection next hop information into the forwarding next hop information by querying a routing information base of the network device, converting the redirection next hop information into the forwarding next hop information by querying a flow specification routing table of the network device, or first querying a flow specification routing table of the network device, and when the flow specification routing table does not have a routing entry matching the redirection next hop information, converting the redirection next hop information into the forwarding next hop information by querying a routing information base of the network device.

Optionally, the control message is a BGP FlowSpec message or another type of message.

In an optional embodiment, if the control message is the BGP FlowSpec message, a traffic action field in an extended community attribute of the BGP FlowSpec message is used to carry the conversion indication.

Optionally, the conversion indication may occupy 1 bit in the traffic action field.

In an optional embodiment, if the control message is the BGP FlowSpec message, a community field in a wide community attribute of the BGP FlowSpec message is used to carry the conversion description.

In an optional embodiment, if the control message is the BGP FlowSpec message, the wide community attribute of the BGP FlowSpec message includes a parameter TLV. The parameter TLV includes a flag TLV. The flag TLV is used to indicate a manner of determining the forwarding next hop information corresponding to the redirection next hop information, that is, used to indicate the conversion manner of converting the redirection next hop information of the network device into the forwarding next hop information.

For example, the flag TLV may be used to carry the conversion manner indication in the redirection routing indication.

In an optional embodiment, if the control message is the BGP FlowSpec message, an MP_REACH_NLRI field of the BGP FlowSpec message is used to carry the destination address information of the data flow.

In an optional embodiment, if the control message is the BGP FlowSpec message, the extended community attribute of the BGP FlowSpec message may include a Redirect to IP field. The Redirect to IP field may be used to carry the redirection next hop information of the network device.

Optionally, the processing unit 320 may be further configured to determine the destination address corresponding to the destination address information of the data flow, convert the redirection next hop information of the network device into the forwarding next hop information, and add, to the target forwarding table of the network device, the forwarding entry that includes the destination address and the forwarding next hop information.

Optionally, if the redirection routing indication is further used to indicate the conversion manner of converting the redirection next hop information of the network device into the forwarding next hop information, the processing unit 320 may convert the redirection next hop information of the network device into the forwarding next hop information according to the conversion manner indicated in the redirection routing indication. This embodiment of the present disclosure is not limited thereto.

Optionally, when the processing unit 320 adds, to the target forwarding table of the network device, the forwarding entry that includes the destination address and the forwarding next hop information, if the target forwarding table of the network device has a target forwarding entry including the destination address, the processing unit 320 may replace forwarding next hop information in the target forwarding entry with the forwarding next hop information corresponding to the redirection next hop information, and/ or if the target forwarding table of the network device does not have a target forwarding entry including the destination address, the processing unit 320 creates, in the target forwarding table, the forwarding entry that includes the destination address and the forwarding next hop information.

Optionally, the network device 300 may further include a sending unit (not shown) configured to, before the receiving unit 310 receives the control message sent by the control device, send first capability information to the control device, where the first capability information is used to indicate that the network device has a capability of receiving the redirection routing indication. Correspondingly, the receiving unit 310 is further configured to receive second capability information sent by the control device, where the second capability information is used to indicate that the control device has a capability of sending the redirection routing indication.

In this case, the receiving unit 310 may be further configured to receive the control message that is sent by the control device according to the first capability information sent by the sending unit.

In an optional embodiment, the sending unit may be further configured to send a first BGP OPEN message to the control device, where the first BGP OPEN message carries the first capability information.

Correspondingly, the receiving unit 310 may be further configured to receive a second BGP OPEN message sent by the control device, where the second BGP OPEN message carries the second capability information.

Optionally, the processing unit 320 may be further configured to set, to a highest priority, a priority of the forwarding entry into which the redirection routing information of the data flow is converted.

It should be understood that the network device 300 herein is implemented in a form of a functional unit. The term "unit" herein may be an application-specific integrated circuit (ASIC), an electronic circuit, a processor (for example, a shared processor, a dedicated processor, or a packet processor) configured to execute one or more software or firmware programs, a memory, a combined logic circuit, and/or another appropriate component that supports the described functions. In an optional example, a person skilled in the art may understand that the network device 300 may be corresponding to the target network device in the foregoing embodiments, for example, a forwarding device such as a router or a switch, and may be configured to perform the procedures and/or the steps corresponding to the target network device in the foregoing method embodiments. To avoid repetition, details are not described herein again.

Figure 7:
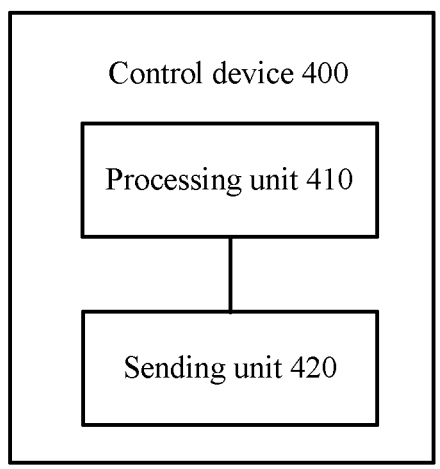
FIG. 7 is a schematic block diagram of a control device according to an embodiment of the present disclosure.

FIG. 7 shows an example of a control device 400 according to an embodiment of the present disclosure. The control device 400 includes a processing unit 410 configured to determine redirection routing information of a data flow, where the redirection routing information of the data flow includes destination address information of the data flow and redirection next hop information of a target network device, and a sending unit 420 configured to send a control message to the target network device, where the control message carries the redirection routing information that is of the data flow and that is determined by the processing unit 410 and a redirection routing indication, the redirection routing indication is used to instruct to convert the redirection routing information of the data flow into a forwarding entry in a target forwarding table, and tablespace of the target forwarding table is greater than tablespace of a flow specification forwarding table of the target network device.

Optionally, the redirection routing indication includes a conversion indication and a conversion description. The conversion indication is used to instruct to perform conversion processing on the redirection routing information of the data flow. The conversion description is used to describe that the conversion processing is to convert the redirection routing information of the data flow into the forwarding entry in the target forwarding table.

Optionally, the target forwarding table may be an FIB.

Optionally, in the target forwarding table, the forwarding entry into which the redirection routing information of the data flow is converted includes a destination address corresponding to the destination address information and forwarding next hop information corresponding to the redirection next hop information.

Optionally, the redirection routing indication is further used to indicate a manner of determining a forwarding next hop corresponding to the redirection next hop information, that is, a conversion manner of converting the redirection next hop information of the target network device into the forwarding next hop information.

In this case, optionally, the redirection routing indication further includes a conversion manner indication. The conversion manner indication is used to indicate the conversion manner of converting the redirection next hop information of the target network device into the forwarding next hop information.

Optionally, the conversion manner indicated in the redirection routing indication may include any one of the following three conversion manners, converting the redirection next hop information of the target network device into the forwarding next hop information by querying a routing information base of the target network device, converting the redirection next hop information of the target network device into the forwarding next hop information by querying a flow specification routing table of the target network device, or first querying a flow specification routing table of the target network device, and when the flow specification routing table does not have a routing entry matching the redirection next hop information, converting the redirection next hop information of the target network device into the forwarding next hop information by querying a routing information base of the target network device.

Optionally, the control message is a BGP FlowSpec message.

In an optional embodiment, if the control message is the BGP FlowSpec message, the BGP FlowSpec message includes an extended community attribute, where a traffic action field in the extended community attribute is used to carry the conversion indication.

Optionally, the conversion indication may occupy 1 bit in the traffic action field.

In an optional embodiment, if the control message is the BGP FlowSpec message, a community field in a wide community attribute of the BGP FlowSpec message may be used to carry the conversion description.

In an optional embodiment, if the control message is the BGP FlowSpec message, the wide community attribute of the BGP FlowSpec message includes a parameter TLV. The parameter TLV includes a flag TLV. The flag TLV is used to indicate a manner of determining the forwarding next hop information corresponding to the redirection next hop information, that is, used to indicate the conversion manner of converting the redirection next hop information of the target network device into the forwarding next hop information.

For example, the flag TLV may be used to carry the conversion manner indication in the redirection routing indication.

In an optional embodiment, if the control message is the BGP FlowSpec message, an MP_REACH_NLRI field of the BGP FlowSpec message is used to carry the destination address information of the data flow.

In an optional embodiment, if the control message is the BGP FlowSpec message, the extended community attribute of the BGP FlowSpec message may include a Redirect to IP field. The Redirect to IP field may be used to carry the redirection next hop information of the network device.

Optionally, the control device 400 further includes a receiving unit (not shown) configured to, before the sending unit 420 sends the control message to the target network device, receive first capability information sent by the target network device, where the first capability information is used to indicate that the network device has a capability of receiving the redirection routing indication.

Correspondingly, the sending unit 420 is further configured to send second capability information to the target network device, where the second capability information is used to indicate that the control device has a capability of sending the redirection routing indication.

In this case, the sending unit 420 may send the control message to the target network device according to the first capability information received by the receiving unit.

Optionally, the receiving unit may be further configured to receive a first BGP OPEN message sent by the target network device, where the first BGP OPEN message carries the first capability information.

Correspondingly, the sending unit 420 may be further configured to send a second BGP OPEN message to the target network device, where the second BGP OPEN message carries the second capability information.

It should be understood that the control device 400 herein is implemented in a form of a functional unit. In an optional example, a person skilled in the art may understand that the control device 400 may be corresponding to the control device in the foregoing embodiments, and may be configured to execute the procedures and/or the steps corresponding to the control device in the foregoing method embodiments. To avoid repetition, details are not described herein again.

Figure 8:
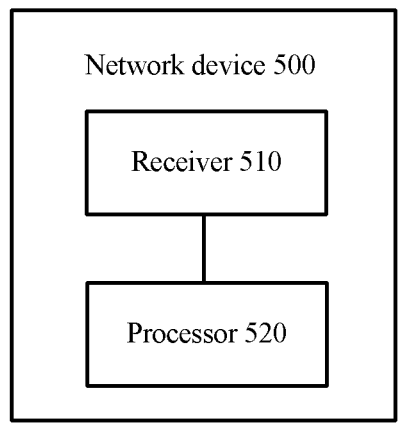
FIG. 8 is a schematic block diagram of a network device according to another embodiment of the present disclosure.

FIG. 8 shows an example of a network device 500 according to an embodiment of the present disclosure. The network device 500 includes a receiver 510 configured to receive a control message sent by a control device, where the control message carries redirection routing information of a data flow and a redirection routing indication, the redirection routing information of the data flow includes destination address information of the data flow and redirection next hop information of the network device, the redirection routing indication is used to instruct to convert the redirection routing information of the data flow into a forwarding entry in a target forwarding table, and tablespace of the target forwarding table is greater than tablespace of a flow specification forwarding table of the network device, and a processor 520 configured to convert the redirection routing information of the data flow into the forwarding entry in the target forwarding table according to the redirection routing indication received by the receiver 510.

Optionally, the redirection routing indication includes a conversion indication and a conversion description. The conversion indication is used to instruct to perform conversion processing on the redirection routing information of the data flow. The conversion description is used to describe that the conversion processing is to convert the redirection routing information of the data flow into the forwarding entry in the forwarding table.

In this case, the processor 520 may further convert the redirection routing information of the data flow into the forwarding entry in the target forwarding table according to the conversion indication and the conversion description.

Optionally, the target forwarding table may be an FIB. This embodiment of the present disclosure is not limited thereto.

Optionally, in the target forwarding table, the forwarding entry into which the redirection routing information of the data flow is converted includes a destination address corresponding to the destination address information and forwarding next hop information corresponding to the redirection next hop information.

In this case, optionally, the redirection routing indication is further used to indicate a conversion manner of converting the redirection next hop information into the forwarding next hop information.

For example, the redirection routing indication may further include a conversion manner indication. The conversion manner indication may be used to indicate the conversion manner of converting the redirection next hop information of the network device into the forwarding next hop information.

Optionally, the conversion manner indicated in the redirection routing indication may include any one of the following three conversion manners, converting the redirection next hop information into the forwarding next hop information by querying a routing information base of the network device, converting the redirection next hop information into the forwarding next hop information by querying a flow specification routing table of the network device, or first querying a flow specification routing table of the network device, and when the flow specification routing table does not have a routing entry matching the redirection next hop information, converting the redirection next hop information into the forwarding next hop information by querying a routing information base of the network device.

Optionally, the control message is a BGP FlowSpec message or another type of message.

In an optional embodiment, if the control message is the BGP FlowSpec message, a traffic action field in an extended community attribute of the BGP FlowSpec message is used to carry the conversion indication.

Optionally, the conversion indication may occupy 1 bit in the traffic action field.

In an optional embodiment, if the control message is the BGP FlowSpec message, a community field in a wide community attribute of the BGP FlowSpec message is used to carry the conversion description.

In an optional embodiment, if the control message is the BGP FlowSpec message, the wide community attribute of the BGP FlowSpec message includes a parameter TLV. The parameter TLV includes a flag TLV. The flag TLV is used to indicate a manner of determining the forwarding next hop information corresponding to the redirection next hop information, that is, used to indicate the conversion manner of converting the redirection next hop information of the target network device into the forwarding next hop information.

For example, the flag TLV may be used to carry the conversion manner indication in the redirection routing indication.

In an optional embodiment, if the control message is the BGP FlowSpec message, an MP_REACH_NLRI field of the BGP FlowSpec message is used to carry the destination address information of the data flow.

In an optional embodiment, if the control message is the BGP FlowSpec message, the extended community attribute of the BGP FlowSpec message may include a Redirect to IP (Redirect to IP) field. The Redirect to IP field may be used to carry the redirection next hop information of the network device.

Optionally, the processor 520 may be further configured to determine the destination address corresponding to the destination address information of the data flow, convert the redirection next hop information of the network device into the forwarding next hop information, and add, to the target forwarding table of the network device, the forwarding entry that includes the destination address and the forwarding next hop information.

Optionally, if the redirection routing indication is further used to indicate the conversion manner of converting the redirection next hop information of the network device into the forwarding next hop information, the processor 520 may convert the redirection next hop information of the network device into the forwarding next hop information according to the conversion manner indicated in the redirection routing indication. This embodiment of the present disclosure is not limited thereto.

Optionally, when the processor 520 adds, to the target forwarding table of the network device, the forwarding entry that includes the determined destination address and the determined forwarding next hop information, if the target forwarding table of the network device has a target forwarding entry including the destination address, the processor 520 may replace forwarding next hop information in the target forwarding entry with the forwarding next hop information corresponding to the redirection next hop information, and/or if the target forwarding table of the network device does not have a target forwarding entry including the destination address, the processor 520 creates, in the target forwarding table, the forwarding entry that includes the destination address and the forwarding next hop information.

Optionally, the network device 500 may further include a transmitter (not shown) configured to, before the receiver 510 receives the control message sent by the control device, send first capability information to the control device, where the first capability information is used to indicate that the network device has a capability of receiving the redirection routing indication. Correspondingly, the receiver 510 is further configured to receive second capability information sent by the control device, where the second capability information is used to indicate that the control device has a capability of sending the redirection routing indication.

In this case, the receiver 510 may be further configured to receive the control message that is sent by the control device according to the first capability information sent by the transmitter.

In an optional embodiment, the transmitter may be further configured to send a first BGP OPEN message to the control device, where the first BGP OPEN message carries the first capability information.

Correspondingly, the receiver 510 may be further configured to receive a second BGP OPEN message sent by the control device, where the second BGP OPEN message carries the second capability information.

Optionally, the processor 520 may be further configured to set, to a highest priority, a priority of the forwarding entry into which the redirection routing information of the data flow is converted.

Optionally, the network device 500 may further include a memory (not shown). The memory may include a read-only memory (ROM) and a random access memory (RAM), and provide an instruction and data for the processor. A part of the memory may further include a nonvolatile random access memory. For example, the memory may further store device type information.

The network device 500 according to this embodiment of the present disclosure may be corresponding to the target network device in the data flow redirection method according to the embodiments of the present disclosure. In addition, the foregoing or other operations and/or functions of the modules in the network device 500 are separately for implementing the procedures and/or the steps corresponding to the target network device in the foregoing method embodiments. For brevity, details are not described herein again.

Figure 9:
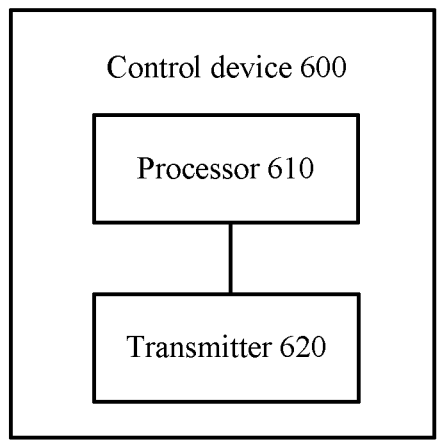
FIG. 9 is a schematic block diagram of a control device according to another embodiment of the present disclosure.

FIG. 9 shows an example of a control device 600 according to an embodiment of the present disclosure. The control device 600 includes a processor 610 configured to determine redirection routing information of a data flow, where the redirection routing information of the data flow includes destination address information of the data flow and redirection next hop information of a target network device, and a transmitter 620 configured to send a control message to the target network device, where the control message carries the redirection routing information that is of the data flow and that is determined by the processor 610 and a redirection routing indication, the redirection routing indication is used to instruct to convert the redirection routing information of the data flow into a forwarding entry in a target forwarding table, and tablespace of the target forwarding table is greater than tablespace of a flow specification forwarding table of the target network device.

Optionally, the redirection routing indication includes a conversion indication and a conversion description. The conversion indication is used to instruct to perform conversion processing on the redirection routing information of the data flow. The conversion description is used to describe that the conversion processing is to convert the redirection routing information of the data flow into the forwarding entry in the target forwarding table.

Optionally, the target forwarding table may be an FIB.

Optionally, in the target forwarding table, the forwarding entry into which the redirection routing information of the data flow is converted includes a destination address corresponding to the destination address information and forwarding next hop information corresponding to the redirection next hop information.

Optionally, the redirection routing indication is further used to indicate a conversion manner of converting the redirection next hop information of the target network device into the forwarding next hop information.

In this case, optionally, the redirection routing indication further includes a conversion manner indication. The conversion manner indication is used to indicate the conversion manner of converting the redirection next hop information of the target network device into the forwarding next hop information.

Optionally, the conversion manner indicated in the redirection routing indication may include any one of the following three conversion manners, converting the redirection next hop information of the target network device into the forwarding next hop information by querying a routing information base of the target network device, converting the redirection next hop information of the target network device into the forwarding next hop information by querying a flow specification routing table of the target network device, or first querying a flow specification routing table of the target network device, and when the flow specification routing table does not have a routing entry matching the redirection next hop information, converting the redirection next hop information of the target network device into the forwarding next hop information by querying a routing information base of the target network device.

Optionally, the control message is a BGP FlowSpec message.

In an optional embodiment, if the control message is the BGP FlowSpec message, the BGP FlowSpec message includes an extended community attribute, where a traffic action field in the extended community attribute is used to carry the conversion indication.

Optionally, the conversion indication may occupy 1 bit in the traffic action field.

In an optional embodiment, if the control message is the BGP FlowSpec message, a community field in a wide community attribute of the BGP FlowSpec message may be used to carry the conversion description.

In an optional embodiment, the wide community attribute of the BGP FlowSpec message includes a parameter TLV. The parameter TLV includes a flag TLV. The flag TLV is used to indicate a manner of determining the forwarding next hop information corresponding to the redirection next hop information, that is, used to indicate the conversion manner of converting the redirection next hop information of the target network device into the forwarding next hop information.

For example, the flag TLV may be used to carry the conversion manner indication in the redirection routing indication.

In an optional embodiment, if the control message is the BGP FlowSpec message, an MP_REACH_NLRI field of the BGP FlowSpec message is used to carry the destination address information of the data flow.

In an optional embodiment, if the control message is the BGP FlowSpec message, the extended community attribute of the BGP FlowSpec message may include a Redirect to IP field. The Redirect to IP field may be used to carry the redirection next hop information of the network device.

Optionally, the control device 600 further includes a receiver (not shown) configured to, before the transmitter 620 sends the control message to the target network device, receive first capability information sent by the target network device, where the first capability information is used to indicate that the network device has a capability of receiving the redirection routing indication.

Correspondingly, the transmitter 620 is further configured to send second capability information to the target network device, where the second capability information is used to indicate that the control device has a capability of sending the redirection routing indication.

In this case, the transmitter 620 may send the control message to the target network device according to the first capability information received by the receiver.

Optionally, the receiver may be further configured to receive a first BGP OPEN message sent by the target network device, where the first BGP OPEN message carries the first capability information.

Correspondingly, the transmitter 620 may be further configured to send a second BGP OPEN message to the target network device, where the second BGP OPEN message carries the second capability information.

Optionally, the control device 600 may further include a memory. The memory may include a read-only memory and a random access memory, and provide an instruction and data for the processor. A part of the memory may further include a nonvolatile random access memory. For example, the memory may further store device type information.

The control device 600 according to this embodiment of the present disclosure may be corresponding to the control device in the data flow redirection method according to the embodiments of the present disclosure. In addition, the foregoing or other operations and/or functions of the modules in the control device 600 are separately for implementing the procedures and/or the steps corresponding to the control device in the foregoing method embodiments. For brevity, details are not described herein again.

It should be understood that, in this embodiment of the present disclosure, the processor may be a central processing unit (CPU), or the processor may be another general-purpose processor, a digital signal processor (DSP), an ASIC, a field programmable gate array (FPGA) or another programmable logic device, a discrete gate or transistor logic device, a discrete hardware component, or the like. The general-purpose processor may be a microprocessor, or the processor may be any conventional processor, or the like.

In an implementation process, the steps in the foregoing methods may be implemented using a hardware integrated logic circuit in the processor, or using an instruction in a form of software. The steps of the methods disclosed with reference to the embodiments of the present disclosure may be directly performed by a hardware processor, or may be performed and implemented using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor executes an instruction in the memory and performs the steps in the foregoing methods in combination with hardware of the processor. To avoid repetition, details are not described herein.

Figure 10:
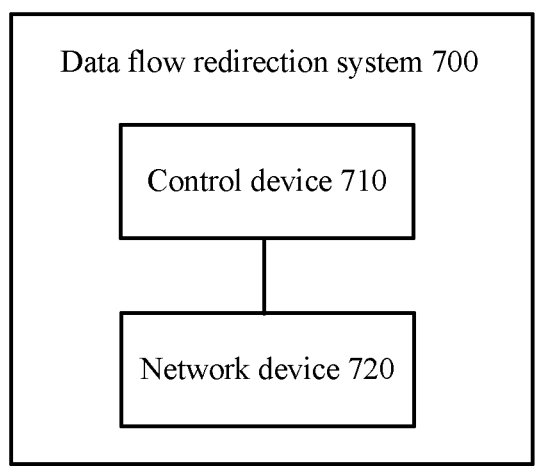
FIG. 10 is a schematic block diagram of a data flow redirection system according to an embodiment of the present disclosure.

FIG. 10 shows a data flow redirection system 700 according to an embodiment of the present disclosure. The system 700 includes a control device 710 and at least one network device 720. Optionally, the control device 710 may be the control device 300. Correspondingly, the network device 720 may be the network device 400. Alternatively, the control device 720 may be the control device 500. Correspondingly, the network device 720 may be the network device 600. This is not limited in this embodiment of the present disclosure.

It should be understood that, the embodiments in this specification are described by focusing on differences between the embodiments. For same or similar parts that are not mentioned, refer to these embodiments.

It should be further understood that, the term "and/or" in the embodiments of the present disclosure describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely examples of specific implementations of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method, comprising:
receiving a control message from a control device, wherein the control message carries redirection routing information of a data flow and a redirection routing indication, wherein the redirection routing information comprises destination address information of the data flow and redirection next hop information of a network device, wherein the redirection routing indication comprises a conversion indication and a conversion description, wherein the redirection routing indication instructs the network device to redirect the data flow and instructs the network device to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description; and
installing the redirection routing information into the forwarding entry in the target forwarding table.

2. The method of claim 1, wherein the conversion indication instructs performing conversion processing on the redirection routing information, wherein the conversion description describes that the conversion processing is to convert the redirection routing information into the forwarding entry in the target forwarding table, and wherein converting the redirection routing information into the forwarding entry in the target forwarding table comprises converting the redirection routing information into the forwarding entry in the target forwarding table according to the conversion indication and the conversion description.

3. The method of claim 1, wherein installing the redirection routing information into the forwarding entry in the target forwarding table comprises:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device.

4. The method of claim 3, wherein the redirection routing indication further comprises a conversion manner instructing to convert the redirection next hop information into the forwarding next hop information, and wherein converting the redirection next hop information of the network device into the forwarding next hop information comprises:
 converting, according to the conversion manner indicated in the redirection routing indication, the redirection next hop information into the forwarding next hop information by querying a routing information base of the network device;
 converting, according to the conversion manner indicated in the redirection routing indication, the redirection next hop information into the forwarding next hop information by querying a flow specification routing table of the network device; or
 querying, according to the conversion manner indicated in the redirection routing indication, the flow specification routing table of the network device, and converting the redirection next hop information of the network device into the forwarding next hop information by querying the routing information base of the network device when the flow specification routing table does not have a routing entry matching the redirection next hop information.

5. The method of claim 1, wherein before receiving the control message from the control device, the method further comprises:
 sending first capability information to the control device, wherein the first capability information indicates that the network device has a capability of receiving the redirection routing indication; and
 receiving second capability information from the control device, wherein the second capability information indicates that the control device has a capability of sending the redirection routing indication.

6. The method of claim 5, wherein sending the first capability information to the control device comprises sending a first BGP open message to the control device, wherein the first BGP open message carries the first capability information, wherein receiving the second capability information from the control device comprises receiving a second BGP open message from the control device, and wherein the second BGP open message carries the second capability information.

7. The method of claim 1, further comprising setting, to a highest priority, a priority of the forwarding entry into which the redirection routing information is converted.

8. The method of claim 1, wherein the target forwarding table is a forwarding information base (FIB).

9. A method, comprising:
 obtaining redirection routing information of a data flow, wherein the redirection routing information comprises destination address information of the data flow and redirection next hop information of a target network device;
 generating a control message, wherein the control message carries the redirection routing information of the data flow and a redirection routing indication, wherein the redirection routing indication comprises a conversion indication and a conversion description, wherein the redirection routing indication instructs the target network device to redirect the data flow and instructs the target network device to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description;
 sending the control message to the target network device.

10. The method of claim 9, wherein the conversion indication instructs performing conversion processing on the redirection routing information, and wherein the conversion description describes that the conversion processing is to convert the redirection routing information into the forwarding entry in the target forwarding table.

11. The method of claim 10, wherein the target forwarding table, the forwarding entry into which the redirection routing information is converted comprises a destination address corresponding to the destination address information and forwarding next hop information corresponding to the redirection next hop information, and wherein the redirection routing indication further comprises a conversion manner instructing to convert the redirection next hop information into the forwarding next hop information.

12. The method of claim 9, wherein before sending the control message to the target network device, the method further comprises:
 receiving first capability information from the target network device, wherein the first capability information indicates that the target network device has a capability of receiving the redirection routing indication; and
 sending second capability information to the target network device, wherein the second capability information indicates that a control device has a capability of sending the redirection routing indication,
 wherein sending the control message to the target network device comprises sending the control message to the target network device according to the first capability information.

13. The method of claim 12, wherein receiving the first capability information from the target network device comprises receiving a first BGP open message from the target network device, wherein the first BGP open message carries the first capability information, wherein sending the second capability information to the target network device comprises sending a second BGP open message to the target network device, and wherein the second BGP open message carries the second capability information.

14. An apparatus, comprising:
 a non-transitory memory storing instructions; and
 one or more processors coupled to the non-transitory memory, wherein the instructions, when executed by the one or more processors, cause the apparatus to be configured to:
  receive a control message from a control device, wherein the control message carries redirection routing information of a data flow and a redirection routing indication, wherein the redirection routing information comprises destination address information of the data flow and redirection next hop information of a network device, wherein the redirection routing indication comprises a conversion indication and a conversion description, wherein the redirection routing indication instructs the network device to redirect the data flow and instructs the network device to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description; and
install the redirection routing information into the forwarding entry in the target forwarding table.

15. The apparatus of claim 14, wherein the conversion indication is configured to instruct the apparatus to perform conversion processing on the redirection routing information, wherein the conversion description is configured to describe that the conversion processing is to convert the redirection routing information into the forwarding entry in the target forwarding table, and wherein the one or more processors are further configured to convert the redirection routing information into the forwarding entry in the target forwarding table according to the conversion indication and the conversion description.

16. The apparatus of claim 14, wherein the instructions, when executed by the one or more processors, further cause the apparatus to be configured to forward data traffic according to the forwarding entry in the target forwarding table.

17. The apparatus of claim 14, wherein the target forwarding table is a forwarding information base (FIB).

18. The apparatus of claim 14, wherein the instructions, when executed by the one or more processors, further cause the apparatus to be configured to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises converting, according to the conversion manner indicated in the redirection routing indication, the redirection next hop information into the forwarding next hop information by querying a routing information base of the network device.

19. The apparatus of claim 14, wherein the instructions, when executed by the one or more processors, further cause the apparatus to be configured to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises converting, according to the conversion manner indicated in the redirection routing indication, the redirection next hop information into the forwarding next hop information by querying a flow specification routing table of the network device.

20. The apparatus of claim 14, wherein the instructions, when executed by the one or more processors, further cause the apparatus to be configured to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises:
querying, according to the conversion manner indicated in the redirection routing indication, a flow specification routing table of the network device; and
converting the redirection next hop information of the network device into the forwarding next hop information by querying a routing information base of the network device when the flow specification routing table does not have a routing entry matching the redirection next hop information.

21. An apparatus, comprising:
a non-transitory memory storing instructions; and
one or more processors coupled to the non-transitory memory, wherein the instructions, when executed by the one or more processors, cause the apparatus to be configured to:
obtain redirection routing information of a data flow, wherein the redirection routing information of the data flow comprises destination address information of the data flow and redirection next hop information of a target network device;
generate a control message, wherein the control message carries the redirection routing information of the data flow and a redirection routing indication, wherein the redirection routing indication comprises a conversion indication and a conversion description, and wherein the redirection routing indication instructs the target network device to redirect the data flow and instructs the target network device to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description;
send the control message to the target network device.

22. The apparatus of claim 21, wherein the conversion indication instructs performing conversion processing on the redirection routing information, and wherein the conversion description describes that the conversion processing is to convert the redirection routing information into the forwarding entry in the target forwarding table.

23. A computer-readable storage medium, comprising a computer program, wherein when the computer program is run on a computer, the computer is enabled to perform:
receiving a control message from a control device, wherein the control message carries redirection routing information of a data flow and a redirection routing indication, wherein the redirection routing information comprises destination address information of the data flow and redirection next hop information of a network device, wherein the redirection routing indication comprises a conversion indication and a conversion description, wherein the redirection routing indication instructs the network device to redirect the data flow and instructs the to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description; and
installing the redirection routing information into the forwarding entry in the target forwarding table.

24. The computer-readable storage medium of claim 23, wherein when the computer program is run on the computer, the computer is further enabled to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises converting, according to the conversion manner indicated in the redirection routing indication, the redirection next hop information into the forwarding next hop information by querying a routing information base of the network device.

25. The computer-readable storage medium of claim 23, wherein when the computer program is run on the computer, the computer is further enabled to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises converting, according to the conversion manner indicated in the redirection routing indication, the redirection next hop information into the forwarding next hop information by querying a flow specification routing table of the network device.

26. The computer-readable storage medium of claim 23, wherein when the computer program is run on the computer, the computer is further enabled to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises:
querying, according to the conversion manner indicated in the redirection routing indication, a flow specification routing table of the network device; and
converting the redirection next hop information of the network device into the forwarding next hop information by querying a routing information base of the network device when the flow specification routing table does not have a routing entry matching the redirection next hop information.

27. A computer-readable storage medium, comprising a computer program, wherein when the computer program is run on a computer, the computer is enabled to perform:
obtaining redirection routing information of a data flow, wherein the redirection routing information comprises destination address information of the data flow and redirection next hop information of a target network device;
generating a control message, wherein the control message carries the redirection routing information of the data flow and a redirection routing indication, wherein the redirection routing indication comprises a conversion indication and a conversion description, and wherein the redirection routing indication instructs the target network device to redirect the data flow and instructs the target network device to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description; and sending the control message to the target network device.

28. A system, comprising:
a control device configured to:
obtain redirection routing information of a data flow, wherein the redirection routing information of the data flow comprises destination address information of the data flow and redirection next hop information of a target network device;
generate a control message, wherein the control message carries the redirection routing information of the data flow and a redirection routing indication, wherein the redirection routing indication comprises a conversion indication and a conversion description, wherein the redirection routing indication instructs a to redirect the data flow and instructs the network device to convert the redirection routing information of the data flow into a forwarding entry in a target forwarding table, wherein the control message is a Border Gateway Protocol (BGP) Flow Specification (FlowSpec) message, wherein a traffic action field in an extended community attribute of the BGP FlowSpec message carries the conversion indication, and wherein a community field in a wide community attribute of the BGP FlowSpec message carries the conversion description; and
send the control message; and
the network device configured to:
receive the control message; and
install the redirection routing information into the forwarding entry in the target forwarding table.

29. The system of claim 28, wherein the network device is configured to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device.

30. The system of claim 29, wherein the redirection routing indication further comprises a conversion manner instructing to convert the redirection next hop information into the forwarding next hop information, and wherein the network device is configured to convert the redirection next hop information of the network device into the forwarding next hop information by converting, according to the conversion manner indicated in the redirection routing indication, the redirection next hop information into the forwarding next hop information by querying a routing information base of the network device.

31. The system of claim 29, wherein the redirection routing indication further comprises a conversion manner instructing to convert the redirection next hop information into the forwarding next hop information, and wherein the network device is configured to convert the redirection next hop information of the network device into the forwarding next hop information by converting, according to the conversion manner indicated in the redirection routing indication, the redirection next hop information into the forwarding next hop information by querying a flow specification routing table of the network device.

32. The system of claim 29, wherein the redirection routing indication further comprises a conversion manner instructing to convert the redirection next hop information into the forwarding next hop information, and wherein the network device is configured to convert the redirection next hop information of the network device into the forwarding next hop information by querying, according to the conversion manner indicated in the redirection routing indication, a flow specification routing table of the network device, and converting the redirection next hop information of the network device into the forwarding next hop information by querying a routing information base of the network device when the flow specification routing table does not have a routing entry matching the redirection next hop information.

33. The system of claim 28, wherein the network device is further configured to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises converting, according to the conversion manner indicated in the redirection routing indication, the redirection next hop information into the forwarding next hop information by querying a routing information base of the network device.

34. The system of claim 28, wherein the network device is further configured to install the redirection routing information into the forwarding entry in the target forwarding table by:
obtaining a destination address corresponding to the destination address information of the data flow;
converting the redirection next hop information of the network device into forwarding next hop information; and
adding the forwarding entry comprising the destination address and the forwarding next hop information to the target forwarding table of the network device,
wherein the redirection routing indication further comprises a conversion manner instructing to convert the redirection next hop information into the forwarding next hop information, and
wherein converting the redirection next hop information of the network device into the forwarding next hop information comprises converting, according to the conversion manner indicated in the redirection routing indication, the redirection next hop information into the forwarding next hop information by querying a flow specification routing table of the network device.

35. The system of claim 28, wherein the network device is further configured to install the redirection routing information into the forwarding entry in the target forwarding table by:
obtaining a destination address corresponding to the destination address information of the data flow;
converting the redirection next hop information of the network device into forwarding next hop information; and adding the forwarding entry comprising the destination address and the forwarding next hop information to the target forwarding table of the network device, wherein the redirection routing indication further comprises a conversion manner instructing to convert the redirection next hop information into the forwarding next hop information, and wherein converting the redirection next hop information of the network device into the forwarding next hop information comprises:
- querying, according to the conversion manner indicated in the redirection routing indication, a flow specification routing table of the network device; and
- converting the redirection next hop information of the network device into the forwarding next hop information by querying a routing information base of the network device when the flow specification routing table does not have a routing entry matching the redirection next hop information.

\* \* \* \* \*

UNITED STATES PATENT AND TRADEMARK OFFICE
CERTIFICATE OF CORRECTION

PATENT NO. : 11,855,887 B2
APPLICATION NO. : 16/904129
DATED : December 26, 2023
INVENTOR(S) : Haibo Wang et al.

Page 1 of 1

It is certified that error appears in the above-identified patent and that said Letters Patent is hereby corrected as shown below:

In the Claims

Claim 9, Column 32, Line 6: "the conversion description;" should read "the conversion description; and"

Claim 21, Column 34, Line 66: "conversion description;" should read "conversion description; and"

Claim 23, Column 35, Line 21: "and instructs the to convert the redirection routing" should read "and instructs the network device to convert the redirection routing"

Claim 28, Column 37, Line 17: "to redirect the data flow and instructs the network" should read "network device to redirect the data flow and instructs the network"

Signed and Sealed this
Twenty-seventh Day of February, 2024

Katherine Kelly Vidal
*Director of the United States Patent and Trademark Office*